(12) United States Patent
Vieira et al.

(10) Patent No.: US 11,615,482 B2
(45) Date of Patent: Mar. 28, 2023

(54) SYSTEMS AND METHODS FOR ENHANCED ORGANIZATIONAL TRANSPARENCY USING A CREDIT CHAIN

(71) Applicant: JPMORGAN CHASE BANK, N.A., New York, NY (US)

(72) Inventors: Joe Vieira, Wilmington, DE (US); Kam Sat Lee, Westerville, OH (US); Murali Pingali, New Albany, OH (US); Michael Cornell, Delaware, OH (US); Suresh Shetty, Monmouth Junction, NJ (US); Samer Falah, Staten Island, NY (US); Ankur Sambhar, Thane West (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 239 days.

(21) Appl. No.: 17/066,084

(22) Filed: Oct. 8, 2020

(65) Prior Publication Data

US 2021/0097627 A1    Apr. 1, 2021

Related U.S. Application Data

(62) Division of application No. 15/234,263, filed on Aug. 11, 2016, now Pat. No. 10,915,969.

(51) Int. Cl.
*G06Q 40/00*     (2012.01)
*G06Q 40/12*     (2023.01)

(52) U.S. Cl.
CPC .................. *G06Q 40/12* (2013.12)

(58) Field of Classification Search
CPC ...................................................... G06Q 40/12
See application file for complete search history.

(56) References Cited

U.S. PATENT DOCUMENTS

| | | |
|---|---|---|
| 2014/0164201 A1* | 6/2014 | Boberski ............... G06Q 40/04 705/37 |
| 2014/0279526 A1 | 9/2014 | Jackson |
| 2015/0206106 A1 | 7/2015 | Yago |
| 2015/0332283 A1 | 11/2015 | Witchey |

(Continued)

OTHER PUBLICATIONS

Extended European Search Report, dated Dec. 17, 2019, from corresponding European Patent Application No. 17840087.5.

(Continued)

*Primary Examiner* — Paul Danneman
(74) *Attorney, Agent, or Firm* — Greenberg Traurig LLP

(57) ABSTRACT

Systems and methods for enhanced organizational transparency using a linked activity chain in a ledger are disclosed. In one embodiment, a method may include (1) a back end for an organization comprising at least one computer processor receiving a first communication from a first entity comprising a first customer interaction with the first entity; (2) the back end writing the first communication to a ledger for the organization as a first block in a linked activity chain; (3) the back end receiving a second communication from a second entity comprising a second customer second activity with the second entity; (4) the back end writing the second communication to the ledger for the organization as a second block in the linked activity chain; (5) the back end calculating a summary score for the customer based on the blocks in the linked activity chain.

15 Claims, 7 Drawing Sheets

(56) References Cited

U.S. PATENT DOCUMENTS

| | | |
|---|---|---|
| 2015/0379510 A1 | 12/2015 | Smith |
| 2016/0028552 A1 | 1/2016 | Spanos et al. |
| 2016/0140653 A1 | 5/2016 | Mckenzie |
| 2016/0292672 A1 | 10/2016 | Fay et al. |
| 2016/0321654 A1 | 11/2016 | Lesavich et al. |
| 2016/0342994 A1 | 11/2016 | Davis |
| 2017/0011460 A1* | 1/2017 | Molinari ............... G06Q 40/06 |
| 2017/0046652 A1 | 2/2017 | Haldenby et al. |
| 2017/0132625 A1 | 5/2017 | Kennedy |
| 2017/0230189 A1 | 8/2017 | Toll et al. |

OTHER PUBLICATIONS

Bitfury Group; Smart Contracts on Bitcoin Blockchain, BitFury Group Sep. 4, 2015.

Zhang, Fan; et al, Town Crier: An Authenticated Data Feed for Smart Contracts, IACR, International Association for Cryptologic Research, Jun. 30, 2016.

Silverberg, Kristen; et al, Getting Smart: Contracts on the Blockchain, Institute of International Finance, May 2016.

Courtneidge, Robert; et al, Blockchain And Financial Services Industry Snapshot And Possible Future Developments, Innovalue Management Advisors Ltd., Jul. 2015.

Foroglou, Georgios; et al, Further applications of the blockchain, University of Macedonia, May 2015.

Wikipedia, Blockchain, Wikipedia The Free Encyclopedia, Year 2016.

International Search Report, dated Oct. 31, 2017, from corresponding International Application No. PCT/US2017/045699.

Written Opinion of the International Searching Authority, dated Oct. 31, 2017, from corresponding International Application No. PCT/US2017/045699.

* cited by examiner

| Date | Party | Transaction | Account | Tied to | Data |
|---|---|---|---|---|---|
| 01/30/2016 | Mortgage | New Customer | ECI = 11111111 | 1 | ECI # |
| 01/30/2016 | Credit Risk (listening for the new customer) | Set/offer Credit Lines | ECI = 11111111 | 1.1 | (look at Credit Risk analytics design) (and Credit Bureau interface) Account balances D&I Credit Score Auto limit Revolving limit Mortgage limit Total exposure limit |
| | MX Mortgage | Inquiry on ECI 11111111 | ECI = 11111111 | | Returns the credit score, balances and limits that MX Mortgage is entitled to read |
| 02/15/2016 | Mortgage | Request approval for 10K loan | ECI = 11111111 | 2 | (Look at credit decision interface, such a Zippy, to see what fields place) |
| 02/15/2016 | Credit Risk | Approval | ECI = 11111111 | 2.1 | Look at credit decision interface Balance adjustments (credit risk analytics outcomes) |
| 04/30/2016 | Fraud Investigations | ID theft Fraud | ECI = 11111111 | 3 | Smart contract changes all loan limits to 0; any loan requires manual review and customer validation until lifted |
| 5/31/2016 | POS Auth | Credit card compromised | ECI = 22222222 | 4 | Smart contract changes the "open to buy" to $0 for the credit card belonging to ECI = 22222222 |

Figure 3

SYSTEMS AND METHODS FOR ENHANCED ORGANIZATIONAL TRANSPARENCY USING A CREDIT CHAIN

RELATED APPLICATIONS

This application is a Divisional Application Of U.S. patent application Ser. No. 15/234,263, filed Aug. 11, 2016, now U.S. Pat. No. 10,915,969 the disclosure of which is hereby incorporated by reference in its entirety.

BACKGROUND OF THE INVENTION

1. Field of the Invention

The present disclosure generally relates to systems and methods for enhanced organizational transparency using a credit chain.

2. Description of The Related Art

Due to lag and other issues, business entities—even those within the same organization—may not have the most up-to-date information regarding the organization's customer. Important decisions, such as whether to issue credit to the customer, the amount of credit to issue to a customer, whether an account has been compromised, the current quality of a loan or pool of loans, etc. may not be based on the most up-to-date customer information.

SUMMARY OF THE INVENTION

Systems and methods for enhanced organizational transparency using a linked activity chain in a ledger are disclosed. In one embodiment, a method may include (1) a back end for an organization comprising at least one computer processor receiving a first communication from a first entity comprising a first customer interaction with the first entity; (2) the back end writing the first communication to a ledger for the organization as a first block in a linked activity chain; (3) the back end receiving a second communication from a second entity comprising a second customer second activity with the second entity; (4) the back end writing the second communication to the ledger for the organization as a second block in the linked activity chain; (5) the back end calculating a summary score for the customer based on the blocks in the linked activity chain.

In one embodiment, at least one of the first activity and the second activity may be a financial activity conducted by the customer. The financial activity may be a financial transaction, a mortgage, etc.

In one embodiment, at least one of the first activity and the second activity may indicate a fraudulent activity.

In one embodiment, at least one of the first entity and the second entity is internal to the organization.

In another embodiment, at least one of the first entity and the second entity is external to the organization.

In one embodiment, the method may further include the back end receiving, from a requesting entity, a request for the summary score; and the back end communicating, to the requesting entity, the summary score.

In one embodiment, the requesting entity may be one of the first entity or the second entity.

In one embodiment, the first communication may include a smart contract.

In one embodiment, the ledger may be specific to a customer. In another embodiment, the ledger may include activities for a plurality of customers.

In one embodiment, the linked activity chain may be a blockchain.

In one embodiment, the first block and the second block may each comprise a hash of a previous block in the activity chain.

Systems and methods for inter-linking dependent processes across multiple parties using smart contracts are disclosed. In one embodiment, a method may include (1) a back end for a lending financial institution receiving, from a customer, an identification of a collateral for a loan to purchase the collateral and an identification of an insurer that insures the collateral; (2) at least one computer processor for the lending financial institution generating a smart contract that directs the back end to cause the insurer to pay the financial institution a loan balance for the collateral in response to an insurance claim based on a value for the collateral falling below a predetermined amount; (3) the at least one computer processor for the lending financial institution writing the smart contract to a ledger as a first block in a linked transaction chain; (4) the insurer writing an insurance claim to the ledger as a second block in the linked transaction chain indicating that the value for the collateral fell below a predetermined amount; and (5) a back end automatically executing the smart contract, whereby the insurer pays the loan balance to the lending financial institution and any balance to the customer.

In one embodiment, the insurance claim may be associated with a lost, stolen, or damaged vehicle. In another embodiment, the insurance claim may be associated with real estate.

In one embodiment, the method may further include the back end leveraging a data oracle to list the collateral for auction.

According to another embodiment, a method for inter-linking dependent processes across multiple parties using smart contracts may include (1) a back end for a lending financial institution receiving, from a customer, an identification of a vehicle being purchased with a loan and an identification of an insurer that insures the vehicle; (2) at least one computer processor for the lending financial institution generating a smart contract that directs the back end to restrict access to the vehicle in response to the vehicle not being covered by insurance; (3) the at least one computer processor for the lending financial institution writing the smart contract to a ledger as a first block in a linked transaction chain; (4) the insurer writing an notice to the ledger that the vehicle is no longer insured; and (5) a back end automatically executing the smart contract, whereby the back end causes a signal that disables the vehicle over a network.

In one embodiment, the method may further comprise the back end leveraging a data oracle to repossess the vehicle.

BRIEF DESCRIPTION OF THE DRAWINGS

For a more complete understanding of the present invention, the objects and advantages thereof, reference is now made to the following descriptions taken in connection with the accompanying drawings in which:

FIG. 3 depicts an exemplary ledger according to one embodiment;

DETAILED DESCRIPTION OF PREFERRED EMBODIMENTS

Figure 1:
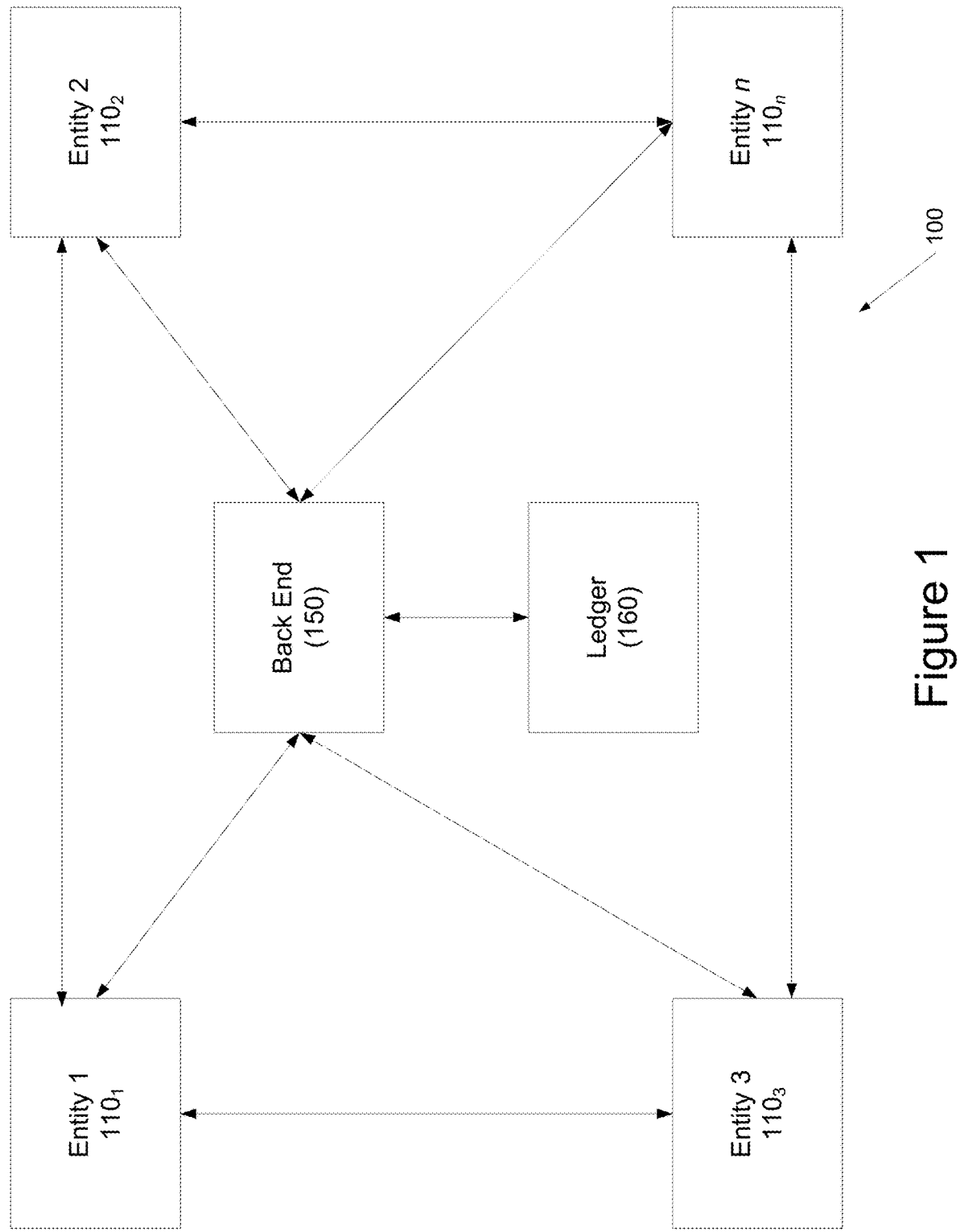
FIG. 1 depicts a system for enhanced organizational transparency using a credit chain according to one embodiment.

Several embodiments of the present invention and their advantages may be understood by referring to FIGS. 1-7.

Embodiments are directed to enhanced organizational transparency using a credit chain on a ledger.

Ledgers, such as a Blockchain-based ledger, may be used to provide transparency to all stakeholders that may be involved in decisions involving an individual or entity. It may further be used to assess a financial product, such as the quality of mortgages that may make up the financial product.

In one embodiment, in a credit-based environment, the ledger may provide transparency to the entity that may default, as well as the other entities that may have exposure to that entity. For a consumer, the ledger may represent the consumer's credit exposure. Household income, deposit accounts, etc. may improve the consumer's credit exposure while opening or using credit would weaken (e.g., increase exposures) that position. The collective improvements and exposures contribute to the consumer's "credit chain."

Other activities, such as fraud on an account, identify theft, etc. may also impact the credit chain. In one embodiment, using "smart contracts," events (like identity theft) could have an immediate effect on the consumer's exposure and all accounts in the credit chain. The activity could impact a single account, a subset of accounts, or all accounts, depending on the specific details of the activity.

In another embodiment, activities such as bankruptcy, collection activity, etc. may be written to the ledger. These activities may not only impact the customer's summary score, but, for example, may also provide an alert to any party that may have extended credit to the customer, may prevent additional credit from being offered to the customer, etc.

In one embodiment, the ledger may be extended to any lender or institution (internal and external) that could add improvements and exposures to the consumer's credit chain. Thus, the consumer's complete credit chain may be assessed. In one embodiment, third parties (e.g., institutions and jurisdictions (e.g. bankruptcy court, tax jurisdictions, etc.)) may access the credit chain.

Embodiments may provide certain benefits, including a coordinated, simultaneous, and consistent response to an event involving a consumer (e.g., a response to a bankruptcy or fraud event, a lien on an asset, credit exposure limit or credit freeze), a consistent view to all participants to the credit exposure and the credit behavior of a consumer, availability of changes to a consumer's credit chain to the entities within the organization, etc.

In another embodiment, the leger may be used to validate the source of wealth and consistency in reporting to different organizations (government and private). For example, an asset reported to improve the credit exposure position may be available for other entities to validate or provide that asset's value and to establish or validate an assessment of a customer's overall financial position (e.g., the customer's eligibility for student loans, financial aid, tax liability, etc.).

In still another embodiment, as "collateral," improvements, or exposures change, the price of financial products (e.g., loans, credit cards, etc.) may fluctuate to reflect the strength of the customer's financial position. For example, if the customer has a deposit account with $100,000 when the loan is issued, and the balance drops to $10,000, the rate the customer is paying on the outstanding balances may change to reflect the customer's changing credit position.

In another embodiment, the credit chain may be used to quantify the quality of a single loan, or a collections of loans (as in a securitized pool of loans). The quality of each loan is supported by the credit exposure position of the customer (s) on the loan, and the credit quality of each loan may be revised so that the quality of a loan or a pool of loans changes to reflect the latest credit exposure position of each corresponding customer, Example uses cases for the system and method include credit reporting, credit assessments and credit exposure limits, validating sources of funds to be used as collateral or to establish a measure of wealth, appraisals and valuations for assets or improvements, claims against assets or the customer, liens, lien releases, assignment of debt, new credit checks, identity theft, etc.

Referring to FIG. 1, a system for enhanced organizational transparency using a credit chain are disclosed according to one embodiment. In one embodiment, system 100 may include an organization that may include a plurality of entities (e.g., entity 1 110$_1$, entity 2 110$_2$, . . . entity n 110$_n$. Each of the entities 110 may communicate with each other directly or indirectly.

In one embodiment, one or more entity 110 may be part of the same organization and may be involved in some manner in a consumer's credit chain. For example, each entity 110 may submit improvements (e.g., household income, deposit account, retirement accounts, etc.), exposures (e.g., mortgages, loans, credit card balances, etc.), and activities (e.g., account opening, fraudulent activity, lost or stolen credit cards, etc.).

In one embodiment, one or more entity 110 may be external to the organization, or may receive data from an entity external to the organization. For example, one entity 110 may be an external credit bureau. In another embodiment, one entity 110 may be within the organization and receive data from an external credit bureau. As another example, one entity 110 may receive be an unrelated financial institution with which the consumer has an account (e.g., a loan, a deposit account, a retirement account, etc.).

Other examples of entities 110 may include a holder fiduciary, or a counterparty to an asset such as pension, insurance, IRAs, estates, etc.; a jurisdiction with record of ownership to property such as land, buildings, businesses or entitlements; agencies with authority to carry out estate, tax, and bankruptcy laws, etc.

Other types of entities 110, including entities internal to the organization and external to the organization, may be used as necessary and/or desired.

Any one or more of entities 110 may submit transactions or be a party to a transaction by way of confirming the existence of an improvement, exposure or activity. For example, if a customer applies for a loan and identifies a bank account or land as collateral, the "counterparty" could validate the existence of the asset. The transaction would not be committed without the validation of the counterparty.

In one embodiment each entity 110 may submit improvements, exposures, and/or activities to back end 150 and counterparties may at their option, respond to the transaction (e.g., add to it, or respond in a way that will commit the transaction).

In another embodiment, each entity 110 may submit improvements, exposures, and/or activities to back end 150. In one embodiment, each submission may be in the form of a smart contract which may be fully or partially self-executing and/or self-enforcing In one embodiment, back end 150 may be hosted by one or more server. In one embodiment, back end 150 may be hosted by an organization (e.g., the financial institution with which the consumer has an account), by a third party (e.g., a separate financial institution, a credit bureau, etc.) etc.

In one embodiment, back end 150 may write, or commit, the exposures, improvements, and/or activities to ledger 160, such as a Blockchain ledger.

In one embodiment, one or more ledgers 160 may be provided. For example, one ledger may be provided for all of the organizations customers. As another example, each customer may have its own ledger.

In one embodiment, some or all of entities 110 may have access to ledger 160 to view the committed improvements, exposures, and/or activities. In another embodiment, access to ledger 160 may be restricted to certain entities 110 as necessary and/or desired. In one embodiment, entities that are outside of the organization involved in, for example, a credit decision for the organization, such as entities that are external to the organization, entities that are report-only entities, etc. may not be able to access ledger 160.

As another example, if entity 1 110₁ provides an account balance, entity 1 110₁ may be able to see the account details. Other entities (e.g., entity 2 110₂, entity 3 110₂, however, may only able to see the account total. Thus, each entity 110 may have access to a summary score indicative of the total debt, incomer or other, without necessarily having access to account details.

In one embodiment, back end 150 may provide one or more notifications to one or more entity 110 upon the receipt of submissions. In one embodiment, only certain submissions (e.g., fraudulent activity) may trigger a notification.

In one embodiment, if the improvements, exposures, and/or activities was submitted as a smart contract, back end 150 may execute the smart contract.

In one embodiment, back end 150 may create a summary score for the consumer based on the submissions. In one embodiment, back end 150 may assess the improvements, exposures, and/or activities, and may generate a score that may be used in decisioning the consumer, for example, for additional products, for the maximum amount of credit that may be extended to the consumer, etc.

In one embodiment, transparency to stakeholders involved in an individual (or entity's) credit, as well as the quality of loans that may make up a financial product may be provided. The transparency is a result of the ability to see the customer's assets and liabilities that are the basis for the customer's summary score, and because the record of the customer's assets and liabilities may be continuously updated. The quality of the loans and/or financial product may be evaluated based on this information.

Figure 2:
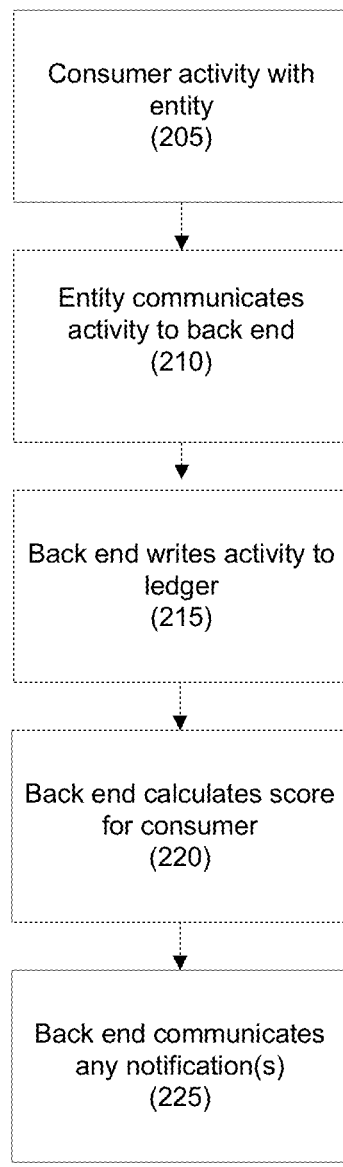
FIG. 2 depicts a method for enhanced organizational transparency using a credit chain according to one embodiment.

Referring to FIG. 2, a method for enhanced organizational transparency using a credit chain is disclosed according to one embodiment. In step 205, an entity (e.g., an entity of an organizational, an entity external to the organization, an entity internal to the organization but in communication with entity external to the organization, etc.) may receive an activity involving a consumer. In one embodiment, the entity may be a sub-entity of an organization, an affiliate of an organization, etc.

In one embodiment, the entity may be external to the organization, such as a credit bureau, an external financial institution, a social media feed, etc.

In one embodiment, the activity may be related to an improvement and/or an exposure, as discussed above. In one embodiment, the activity may be based on an external entity score (e.g., a credit score).

Example activities may include the addition of a new customer, additional of credit limits and/or pre-approvals, credit requests and/or line increases, new deposit and investment accounts or balance updates, addition of collateral, line of credit balance changes, adding a payment behavior, collections activity, bankruptcy, fraud events, etc.

In step 210, the entity may communicate the activity to a back end. In one embodiment, the activity may communicate with the back end by any suitable communication network.

In one embodiment, the activity may be communicated as a smart contract.

In one embodiment, only activities about a certain threshold may be communicated to the back end. For example, a deposit account balance change may be required to be greater than a certain amount in order to communicate the balance change to the back end.

In step 215, the back end may write the activity to a ledger, such as a Blockchain-based ledger. In one embodiment, the activity may be written as a block in an activity chain.

In one embodiment, a separate ledger may be maintained for each consumer; in another embodiment, a plurality of ledgers, with each ledger being used with a plurality of consumers, may be provided; in another embodiment, only one ledger may be provided.

In one embodiment, one or more entities may access the ledger, and may query the back end for a consumer's score o recent transactions in the credit chain. In one embodiment, this may be part of the decisioning processes for increasing a credit amount, issuing a new financial instrument, reevaluating the credit quality of an existing loan, etc.

Referring to FIG. 3, an example ledger is provided. In this example, the ledger includes entries for multiple customers (e.g., ECI 11111111 and 22222222).

In step 220, the back end may calculate a score for the consumer. In one embodiment, the score may be based on the improvements, exposures, and other activities (e.g., credit scores from credit bureaus, etc.).

In step 225, the back end may communicate any notifications to one or more of the entities as is necessary and/or desired. In one embodiment, certain activities, such as fraudulent activity, may trigger a notification. In one embodiment, the notification may cause the receiving entity to take an action (e.g., close/suspend an account, increase fraud detection parameters, alert the consumer, notify the investors/stakeholders of a change in credit quality, etc.).

In one embodiment, the back end may communicate the consumer's score to one or more entity. In one embodiment, the back end may communicate the score if a predetermined condition is met, such as the score changes by a predetermined percentage, represents a certain risk change for the consumer, etc.

In one embodiment, if the improvements, exposures, and/or activities was submitted as a smart contract, the back end may execute the smart contract.

Figure 4:
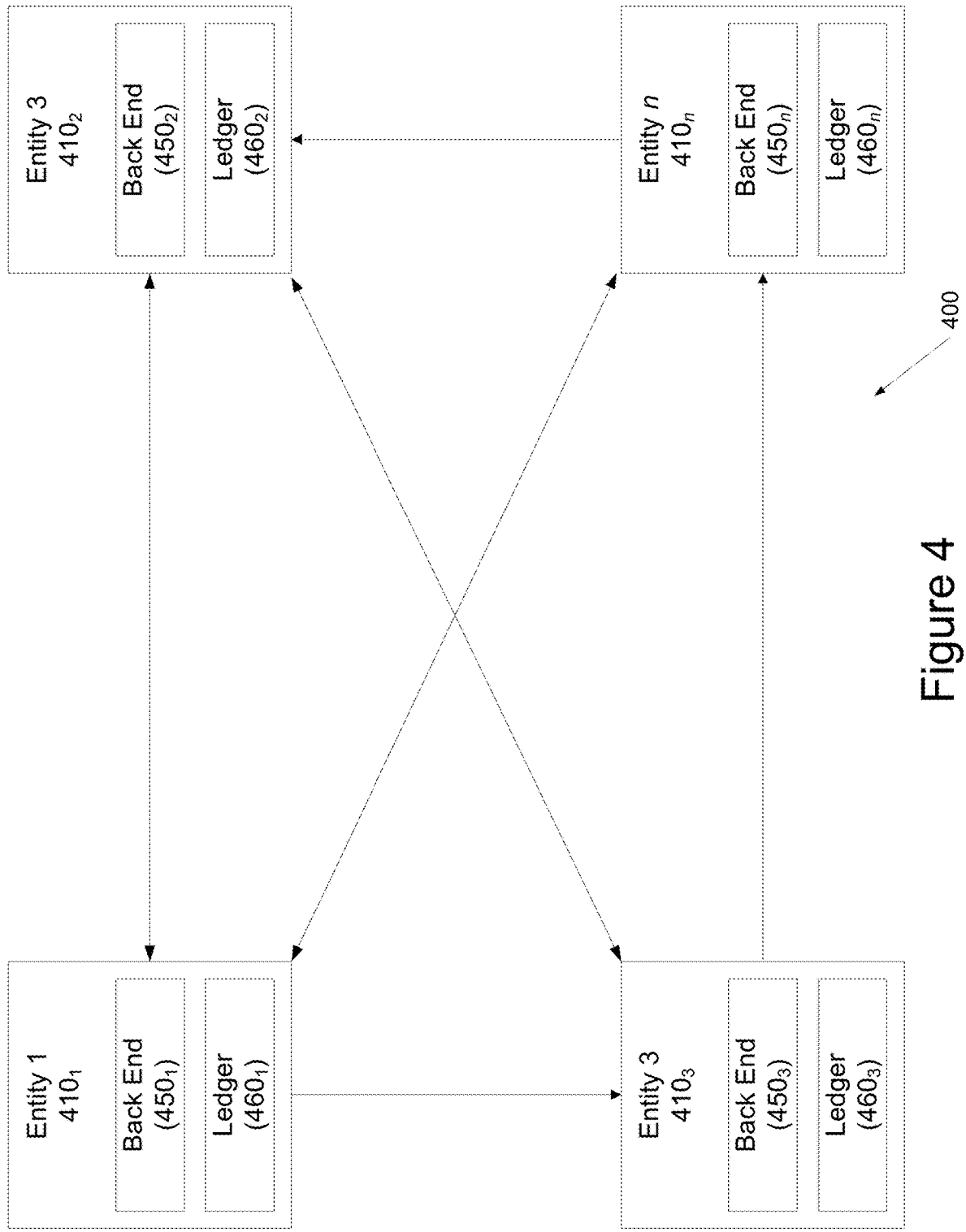
FIG. 4 depicts a system for enhanced organizational transparency using a credit chain according to one embodiment according to another embodiment.

In another embodiment, a distributed ledger system may be used, in which each entity maintains its own copy of the ledger. Referring to FIG. 4, system 400 may include entities $410_1$-$410_n$. Entities 410 may be similar entities to those described above.

In one embodiment, each entity 410 may maintain a copy of distributed ledger 460. For example, entity $410_1$ may maintain a copy of distributed ledger $460_1$. In one embodiment, each entity may further include back end 450 which may write to the respective distributed ledger 460.

In another embodiment, if an entity 410 does not maintain its own copy of the distributed ledger 460 (e.g., it is an external entity), that entity may still communicate activities to the network, and one of more of the entities 410 may write the activity to its distributed ledger 460.

Figure 5:
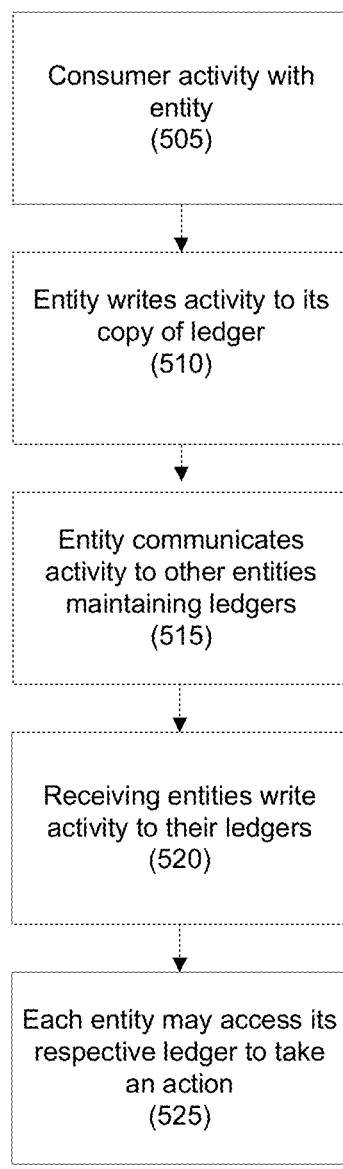
FIG. 5 depicts a method for enhanced organizational transparency using a credit chain according to one embodiment.

Referring to FIG. 5, a method for enhanced organizational transparency using a credit chain is disclosed according to one embodiment. In step 405, an entity may receive an activity involving a consumer. This may be similar to step 205, above.

In step 510, the entity write the activity to its copy of the distributed ledger. In one embodiment, a back end for the entity may write the activity to the entity's copy of the distributed ledger.

In step 515, the entity may communicate the activity to the other entities in the network that maintain copies of the distributed ledger.

In step 520, the other entities receive the activity and may write the activity to their copy of the distributed ledger. In one embodiment, back ends for the other entities may write the activity to their respective copies of the distributed ledger.

In step 525, each entity may access their own copy of the ledger and may make a decision based on the distributed ledger. In another embodiment, the back end for each entity may communicate any notifications to the entity as is necessary and/or desired.

In another embodiment, a leger system and/or smart contracts may be used with financial products (e.g., automobile loans) and insurance products associated with the collateral financed using those financial products. For example, an auto loan has an inherent dependency on the vehicle insurance to reduce the risk exposure to the financial institution. This association, however, is often managed separately and may expose the financial institution to risk. For example, in the case of an accident or lost vehicle, the financial institution may depend on the customer for repayment of the financial liability. Though this liability may be generally addressed by laws that enforce the contract/agreement between financial institution and the customer, the recovery may be an onerous process, and may still expose the financial institution to the risk of default.

Thus, embodiments disclosed herein may automate the recovery of a mortgage or other loan by associating the collateral with the insurance for that collateral using a smart contract and/or a ledger. In embodiments, the system and method may provide the lending financial institutions with an assurance that the loan amount will be repaid directly by the insurance company in case the collateral is lost, stolen, damaged to diminish its value below a certain threshold, etc.

In one embodiment, the smart contract may be submitted to a ledger that may be hosted by the lending financial institution, the insurance company, a third party, a government (e.g., a state government), etc.

Although this disclosure is made in the context of automobile loans, it should be recognized that it has applicability with any loan or line of credit that may be secured with collateral that is subject to insurance, such as houses, boats, recreational vehicles, mortgages, etc.

In one embodiment, when a customer applies for a loan, such as an auto loan, the lending financial institution may provide the loan with an associated smart contract. Thus, if the collateral is stolen or otherwise damaged (e.g., repair cost at or above its actual cash value, an insurance "total loss," damaged to diminish its value below a certain threshold, etc.), the smart contract may direct that the insurance company to directly pay the lending financial institution the outstanding loan amount, or the legally-required amount. Any remaining balance may be paid to the customer.

In one embodiment, the customer may submit a claim to the insurance company, and the insurance company may submit the claim to a ledger. This may trigger the execution of the smart contract by the back end, by the ledger, etc.

In one embodiment, a smart contract may be triggered by sending the transaction directly to the smart contract address. For example, the insurance company may trigger the smart contract after receiving the claim request, or the claim request process itself may trigger the smart contract directly.

In one embodiment, a plurality of smart contracts may interact with one another. For example, a first smart contract may receive the claim request, analyze the claim request, and based on the outcome, may forward the claim request to a second smart contract. The second smart contract may notify the lending financial institution and of the status of the request. It may also transfer the funds directly to the lending financial institution if a threshold is breached.

The lending financial institution may approve the disbursement through the smart contract, which may require approval from the insurance company to agree to directly settle the outstanding loan in the event of a vehicle loss. In one embodiment, this may be achieved through a multi-signature verification process, which may require that the transaction is approved by both the insurance company and the lending financial institution. In another embodiment, the insurance company may send a notification to the lending financial institution and wait for acknowledgement using, for example, a callback transaction from lending financial institution to the insurance company.

In one embodiment, if the vehicle insurance is terminated or suspended, the smart contract may foreclose the loan, increase the interest rate, or lock the vehicle so that the customer cannot use the vehicle. This may be done remotely for "connected" vehicles. Once the insurance coverage is resumed, the customer may then access the vehicle again.

In one embodiment, the insurance company may send a notification to the back end or ledger reflecting the change in insurance status, which may lead to the execution of the smart contract.

Figure 6:
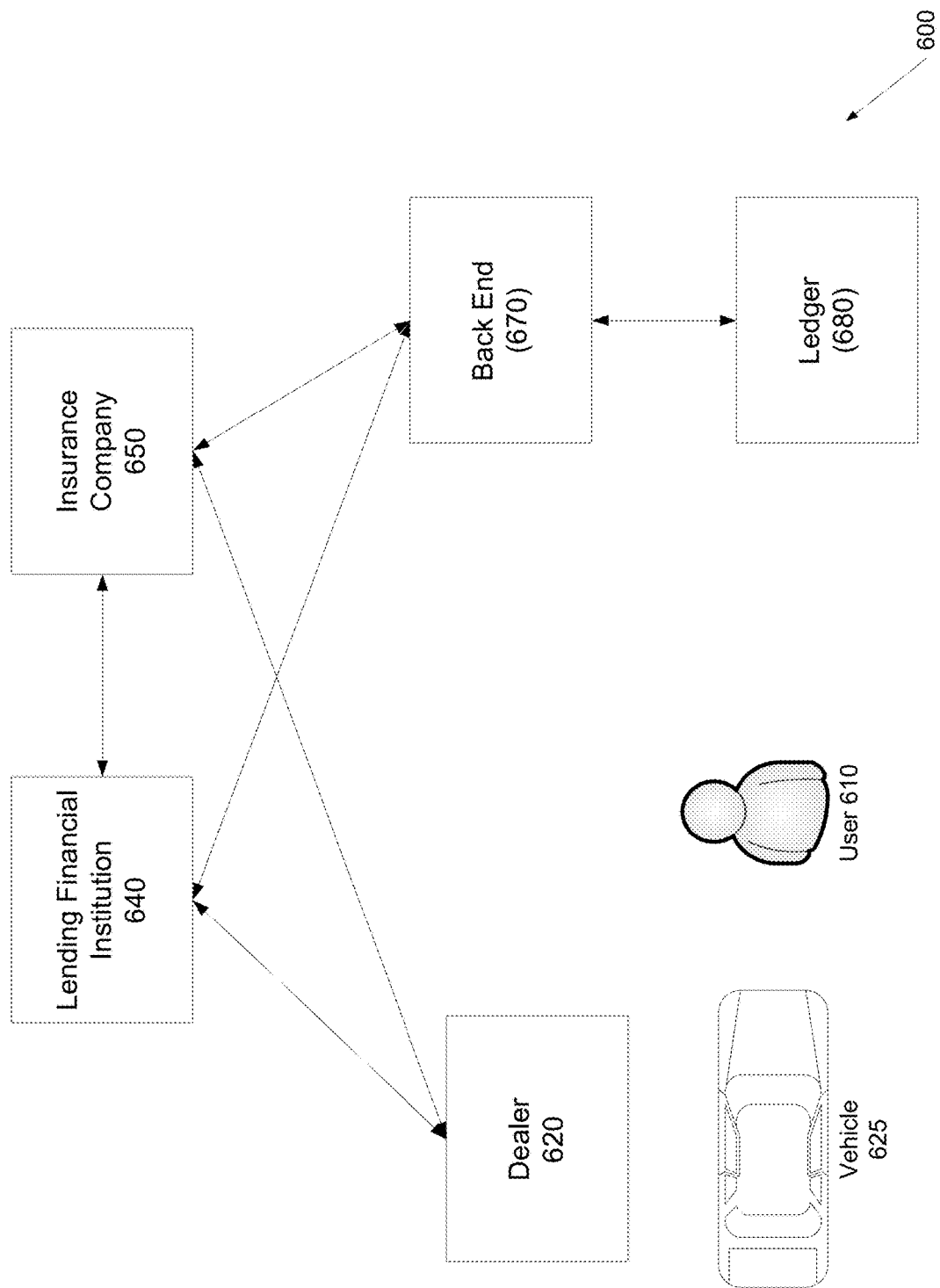
FIG. 6 depicts a system for using a vehicle insurance smart contract is disclosed according to one embodiment.

Referring to FIG. 6, a system for using a vehicle insurance smart contract is disclosed according to one embodiment. System 600 may include a customer that may be shopping for vehicle 625 from dealer 620. Dealer 620 may be traditional brick-and-mortar dealer; in another embodiment, it may be an on-line seller.

As noted above, although this disclosure is made in the context of automobile loans, it should be recognized that it has applicability with any loan or line of credit that may be secured with collateral that is subject to insurance.

Dealer may communicate with financial institution 640 and/or insurance company 650. Similarly, financial institution 640 may communicate with insurance company 650. Such communications may use any suitable communication network, including the Internet, cellular, WiFi, satellite, POTS, etc. networks.

In one embodiment, financial institution 640 and/or insurance company 650 may communicate with back end 670, which may communicate with ledger 680, which may be a ledger as discussed above. In one embodiment, financial institution 640 and/or insurance company 650 may communicate directly with ledger.

In one embodiment, financial institution 640 and/or insurance company 650 may communicate with vehicle 625. For example, if vehicle 625 is a connected vehicle (e.g., an "Internet of Things" enabled vehicle) that provides for remote locking, remote disabling, etc., financial institution 640 and/or insurance company 650 may communicate with vehicle 625 to disable and/or lock vehicle if insurance coverage on vehicle 625 lapses.

Figure 7:
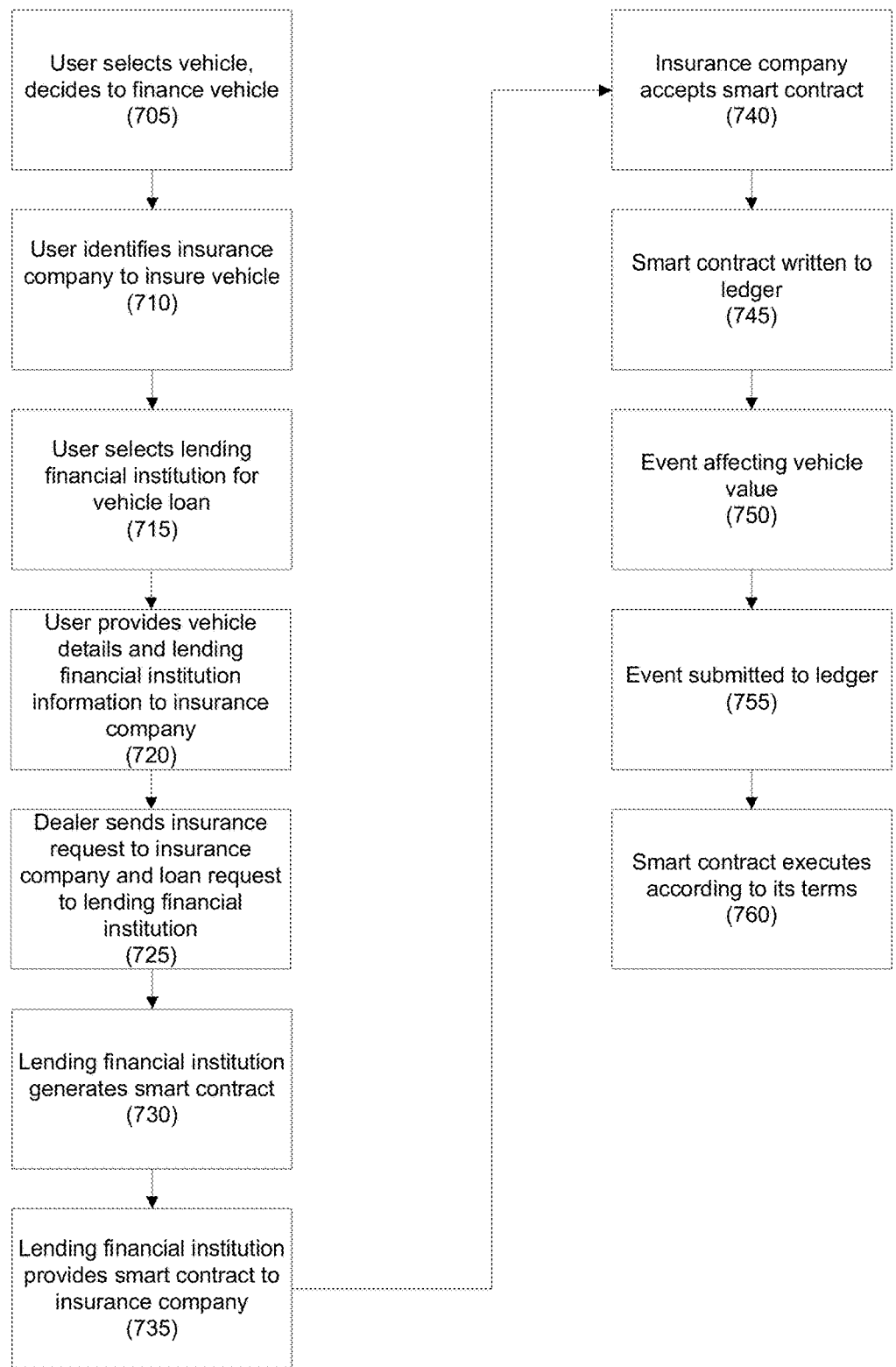
FIG. 7 depicts a method for using a vehicle insurance smart contract is disclosed according to one embodiment.

Referring to FIG. 7, a method for using a vehicle insurance smart contract is disclosed according to one embodiment. In step 705, a customer may select a vehicle to lease or purchase, and may decide to finance the vehicle.

In step 710, the customer may identify an insurance company to insure the vehicle.

In step 715, the customer may select a lending financial institution to finance the vehicle. In one embodiment, the dealer and/or insurance company may assist in identifying the lending financial institution. In another embodiment, the customer may select the lending financial institution without assistance from the dealer.

In step 720, the customer may provide vehicle details and the selected lending financial institution information to the insurance company. In one embodiment, the customer may provide a VIN or other vehicle identifier to the insurance company.

In step 725, the dealer may also communicate an insurance request to the insurance company and/or a loan request to the selected lending financial institution. In one embodiment, if the customer is handling the financing of the vehicle, the customer may submit the request to the lending financial institution.

In step 730, the lending financial institution may generate a smart contract. In one embodiment, the smart contract may specify that lending financial institution is to be paid directly from any insurance recovery for a stolen, lost, or damaged to diminish its value below a certain threshold during the period of the loan.

In one embodiment, the smart contract may require that the lending financial institution is notified of all insurance claims made by the customer. This may permit the lending financial institution to determine the driving behavior of the customer. If there are frequent claims, the lending financial institution may increase the interest rate for the loan, as the resale value of the vehicle may be diminished, thereby increasing the financial institution's risk exposure.

In step 735, the lending financial institution may communicate the smart contract to the insurance company, and, in step 640, the insurance company may accept the smart contract.

In step 745, the insurance company and/or the lending financial institution may submit the smart contract to the ledger. In one embodiment, the lending financial institution may submit the smart contract to the ledger.

In one embodiment, the lending financial institution may submit the smart contract to the ledger, and then the insurance company may agree to the smart contract by submitting its approval for the smart contract to the ledger.

In one embodiment, the lending financial institution and the insurance company may agree to the smart contract before it is written to the ledger. In another embodiment, the smart contract may be activated once it is accepted by the insurance company. If the insurance company does not accept the smart contract, it may then become inactive, self-destruct, etc.

In step 750, an event in which the vehicle value diminishes occurs. In one embodiment, this may involve the vehicle being lost, stolen, or damaged to a point where its value is below a certain threshold.

In step 755, the event is submitted to the ledger. In on embodiment, the insurance company may submit the event as part of a claim made by the customer.

In step 760, the submission to the ledger may cause the smart contract to execute according to its terms. In one embodiment, the insurance company may pay the lending financial institution the loan balance directly, and any remaining funds may be paid to the customer.

In one embodiment, if the insurance lapses, is suspended, expires, etc., the smart contract may inform the customer. In one embodiment, the customer may be provided with options, such as renewing the insurance within a certain time period, paying the balance of the loan, or having the car locked or repossessed.

In one embodiment, if the customer renews or gets new insurance, the existing smart contract may generate new smart contract with the new insurance information/company and self-destruct. If the customer does not renew the insurance within the given timeframe, the smart contract may execute to initiate recovery of the vehicle. In one embodiment, the lending financial institution may lock a "connected vehicle" and initiate repossession.

The smart contact may also initiate a transaction with a repossession company. This transaction may be submitted to the same or a different ledger, or by leveraging a data oracle. For example, the smart contract may leverage the data oracle to fetch or transfer the data to entities outside the ledger.

In one embodiment, once the vehicle is repossessed, the smart contract may offer the vehicle for sale using, for example, an online auto auction through data oracles. Based on the auction sale, the smart contract may transfer the outstanding loan amount to the lending financial institution and any remaining balance may be provided to the customer.

Embodiments may provide some, or all, of the following. The risk exposure to the lending financial institutions in case vehicle is lost or damaged may be reduced. By collecting the data for even small claim settlements, lending financial institutions may adjust the interest rate for the loan based on the customer's driving history. The lending financial institutions may use the information gained from the customer to cross-sell other products (e.g., investment options that can be liquidated immediately in case of medical emergency, finding a good deal on a new car, etc.). The operation cost for the loans may be reduced as the default rate will be lower. Customers may benefit with lower interest rate on loans due to lower risk of default. Embodiments may provide instant repayment of the loan in case of insurance settlement without any human intervention.

Although several embodiments have been disclosed, it should be recognized that these embodiments are not exclusive to each other.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, OSI, Bluetooth LE, ZigBee, NFC, 6LowPan, Z-wave, etc.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for inter-linking dependent processes across multiple parties using smart contracts, comprising:
    a back end for a lending financial institution comprising at least one computer processor receiving, from a customer, a first communication comprising an identification of a collateral for a loan to purchase the collateral and an identification of an insurer that insures the collateral;
    the back end for the lending financial institution generating a smart contract that directs the back end to cause the insurer to pay the lending financial institution a loan balance for the collateral in response to an insurance claim based on a value for the collateral falling below a predetermined amount;
    the back end for the lending financial institution writing the smart contract to a ledger as a first block in a linked transaction chain;
    the back end for the lending financial institution receiving, from the ledger, notice that the value for the collateral is less than the predetermined amount in a second block in the linked transaction chain written by the insurer; and
    the back end for the lending financial institution automatically executing the smart contract, whereby the insurer pays the loan balance to the lending financial institution and any remaining balance to the customer.

2. The method of claim 1, wherein the insurance claim is associated with a lost, stolen, or damaged vehicle.

3. The method of claim 1, wherein the insurance claim is associated with real estate.

4. The method of claim 1, further comprising:
    the back end leveraging a data oracle to list the collateral for auction.

5. The method of claim 1, wherein the ledger comprises a plurality of smart contracts for a plurality of loans.

6. The method of claim 1, wherein the ledger is specific to the loan.

7. The method of claim 1, wherein the ledger comprises a blockchain-based ledger.

8. A method for inter-linking dependent processes across multiple parties using smart contracts, comprising:
    receiving, at a ledger and from a back end for a lending financial institution a first block in a linked activity chain comprising an identification of a collateral for a loan to purchase the collateral, an identification of an insurer that insures the collateral, and a smart contact that directs the back end to cause the insurer to pay the lending financial institution a loan balance for the collateral in response to an insurance claim based on a value for the collateral being below a predetermined amount; and receiving, at the ledger and from the insurer, a second block in the linked activity chain indicating that the value for the collateral is less than the predetermined amount;

wherein the second block causes a smart contract to automatically execute, and wherein the smart contract initiates a payment from the insurer in an amount of the loan balance to the lending financial institution and any remaining balance to an associated customer.

9. The method of claim 8, wherein the insurance claim is associated with a lost, stolen, or damaged vehicle.

10. The method of claim 8, wherein the insurance claim is associated with real estate.

11. The method of claim 8, wherein the backend end leverages a data oracle to list the collateral for auction.

12. The method of claim 8, wherein the ledger comprises a plurality of smart contracts for a plurality of loans.

13. The method of claim 8, wherein the ledger is specific to the loan.

14. The method of claim 8, wherein the ledger comprises a distributed ledger, and the financial institution and the insurer participate as nodes in a distributed ledger network for the distributed ledger.

15. The method of claim 8, wherein the ledger comprises a blockchain-based ledger.

\* \* \* \* \*